(12) United States Patent
Li et al.

(10) Patent No.: US 8,399,546 B2
(45) Date of Patent: Mar. 19, 2013

(54) FLAME RETARDANT THERMOPLASTIC COMPOSITIONS HAVING EMI SHIELDING

(75) Inventors: Gang Li, Shanghai (CN); Thomas Ebeling, Evansville, IN (US); Monica M. Marugan, Schaepmanlaan (NL); Zhaohui Qu, Shanghai (CN); Srinivas Siripurapu, Evansville, IN (US); David Xiangping Zou, Shanghai (CN)

(73) Assignee: Sabic Innovative Plastics IP B.V. (NL)

( * ) Notice: Subject to any disclaimer, the term of this patent is extended or adjusted under 35 U.S.C. 154(b) by 759 days.

(21) Appl. No.: 11/619,686

(22) Filed: Jan. 4, 2007

(65) Prior Publication Data
US 2007/0105994 A1 May 10, 2007

Related U.S. Application Data

(63) Continuation-in-part of application No. 10/912,662, filed on Aug. 5, 2004.

(60) Provisional application No. 60/820,996, filed on Aug. 1, 2006.

(51) Int. Cl.
*C08K 5/523* (2006.01)

(52) U.S. Cl. .......... 524/127; 524/439; 524/440

(58) Field of Classification Search .......... 524/439, 524/440, 127
See application file for complete search history.

(56) References Cited

U.S. PATENT DOCUMENTS

| | | | |
|---|---|---|---|
| 3,635,895 A | 1/1972 | Kramer | |
| 4,001,184 A | 1/1977 | Scott | |
| 4,154,775 A | 5/1979 | Axelrod | |
| 4,217,438 A | 8/1980 | Brunelle et al. | |
| 4,579,906 A | 4/1986 | Zabrocki et al. | |
| 4,716,062 A * | 12/1987 | Klein | 428/515 |
| 4,756,701 A | 7/1988 | Danko et al. | |
| 5,236,988 A * | 8/1993 | Doyama et al. | 524/404 |
| 5,380,795 A | 1/1995 | Gosens et al. | |
| 5,488,086 A | 1/1996 | Umeda et al. | |
| 5,521,230 A | 5/1996 | Bhatia et al. | |
| 6,399,737 B1 * | 6/2002 | Elkovitch | 528/196 |
| 6,613,820 B2 * | 9/2003 | Fujiguchi et al. | 524/109 |
| 2002/0193476 A1 * | 12/2002 | Mitsuta et al. | 524/115 |
| 2003/0105226 A1 | 6/2003 | Cella et al. | |

FOREIGN PATENT DOCUMENTS

| | | |
|---|---|---|
| EP | 0 692 522 | 9/2002 |
| GB | 2043083 | 10/1980 |

* cited by examiner

*Primary Examiner* — Peter Szekely
(74) *Attorney, Agent, or Firm* — Cantor Colburn LLP

(57) ABSTRACT

A flame retardant thermoplastic composition having excellent physical properties that includes 20 to 90 wt. % of a polycarbonate resin; from 1 to 35 wt. % of an impact modifier; from 0.5 to 30 wt. % of a polysiloxane-polycarbonate copolymer including from 8 to 30 wt. % polydimethylsiloxane units or the equivalent molar amount of other diorganosiloxane units; from 0.5 to 20 wt. % of a phosphorus-containing flame retardant, and from 3 to 30 wt. % of metal fiber, each based on the total combined weight of the thermoplastic composition, exclusive of any filler. In one embodiment, a molded sample of the thermoplastic composition having a thickness of 3.0 mm (±10%) has an EMI shielding of at least 20 dB. In addition, a molded sample of the thermoplastic composition is capable of achieving UL94 V0 or V1 rating at a thickness of 1.5 mm (±10%). The compositions are useful in forming flame retardant articles having EMI shielding characteristics.

24 Claims, No Drawings

US 8,399,546 B2

FLAME RETARDANT THERMOPLASTIC COMPOSITIONS HAVING EMI SHIELDING

CROSS REFERENCE TO RELATED APPLICATIONS

This application is a continuation-in-part of U.S. application Ser. No. 10/912,662, which was filed Aug. 5, 2004, and claims priority to U.S. Provisional Application No. 60/820,996, which was filed Aug. 1, 2006.

FIELD OF THE INVENTION

The present invention relates to thermoplastic compositions, and in particular to flame retardant thermoplastic polycarbonate compositions having EMI shielding characteristics, methods of manufacturing these compositions, and use thereof.

BACKGROUND OF THE INVENTION

Polycarbonates are useful in the manufacture of articles and components for a wide range of applications, from automotive parts to electronic appliances. Because of their broad use, particularly in electronic applications, it is desirable to provide polycarbonates with flame retardancy. Many known flame retardant agents used with polycarbonates contain bromine and/or chlorine. Brominated and/or chlorinated flame retardant agents are less desirable because impurities and/or by-products arising from these agents can corrode the equipment associated with manufacture and use of the polycarbonates. Brominated and/or chlorinated flame retardant agents are also increasingly subject to regulatory restriction.

Nonhalogenated flame retardants have been proposed for polycarbonates, including various fillers, phosphorus-containing compounds, and certain salts. It has been difficult to meet the strictest standards of flame retardancy using the foregoing flame retardants, however, without also using brominated and/or chlorinated flame retardants, particularly in thin samples.

Polysiloxane-polycarbonate copolymers have also been proposed for use as non-brominated and non-chlorinated flame-retardants. For example, U.S. Application Publication No. 2003/0105226 to Cella discloses a polysiloxane-modified polycarbonate including polysiloxane units and polycarbonate units, wherein the polysiloxane segments include 1 to 20 polysiloxane units. Use of other polysiloxane-modified polycarbonates are described in U.S. Pat. No. 5,380,795 to Gosen, U.S. Pat. No. 4,756,701 to Kress et al., U.S. Pat. No. 5,488,086 to Umeda et al., and EP 0 692 522B1 to Nodera, et al., for example.

While the foregoing flame-retardants are suitable for their intended purposes, there nonetheless remains a continuing desire in the industry for continued improvement in flame retardance. One need is for articles that are not as prone to burn-through, that is, the formation of holes upon the application of a flame. Thin articles in particular present a challenge, since burn-through holes tend to form more quickly. Non-brominated and/or non-chlorinated flame-retardants can also adversely affect desirable physical properties of the polycarbonate compositions, particularly impact strength.

Also, when polycarbonates are used in electronic applications, many types of electrical equipment produce stray electromagnetic radiation, referred to as electromagnetic interference (EMI). EMI may occur, for example, from analog circuit components or from digital components. EMI emissions are undesirable since they can potentially interfere with the operation of nearby electrical equipment. In addition, regulations (such as the EMC (Electromagnetic Compatibility) regulations) have been established for the maximum permissible EMI emissions from various types of electrical equipment, and these regulations must be taken into account when designing new equipment in which EMI might be a problem.

There are many prior art methods that have been used for EMI shielding purposes, such as electroless plating, conductive painting, vacuum metallising etc. However, all of these methods and/or processes are less desirable due to the disadvantages associated therewith such as environmentally unfriendly processes, poor adhesion between plastics and conductive layer, difficult to handle complex shapes, and the like.

Accordingly, it would be beneficial to provide a thermoplastic material that offers improved flame retardance without use of brominated and/or chlorinated flame-retardants. It would also be beneficial to provide a thermoplastic material that offers improved EMI shielding such that these thermoplastic material may have greater utility in electronic applications. It would also be beneficial if improved flame retardance and EMI shielding could be achieved without substantial degradation of properties such as impact strength.

BRIEF SUMMARY OF THE INVENTION

The present invention provides a flame retardant thermoplastic composition having EMI shielding characteristics and offering excellent physical properties. The thermoplastic compositions can be formed into molded articles. In one embodiment, a molded sample of the thermoplastic composition having a thickness of 3.0 mm (±10%) has an EMI shielding of at least 20 dB. In addition, a molded sample of the thermoplastic composition is capable of achieving UL94 V0 or V1 rating at a thickness of 1.5 mm (±10%).

Accordingly, in one aspect, the present invention provides a thermoplastic composition including from 20 to 90 wt. % of a polycarbonate resin; from 1 to 35 wt. % of an impact modifier; from 0.5 to 30 wt. % of a polysiloxane-polycarbonate copolymer having from 8 to 30 wt. % polydimethylsiloxane units or the equivalent molar amount of other diorganosiloxane units; from 0.5 to 20 wt. % of a phosphorus-containing flame retardant, and from 3 to 30 wt. % of metal fiber, each based on the total combined weight of the thermoplastic composition, exclusive of any filler, wherein a molded sample of the thermoplastic composition having a thickness of 3.0 mm (±10%) has an EMI shielding of at least 20 dB. In an alternative embodiment, a molded sample of the composition is capable of achieving UL94 V0 or V1 rating at a thickness of 1.5 mm (±10%).

In another aspect, the present invention provides a method of manufacture includes the steps of blending the above-described components to form a thermoplastic composition.

In yet another aspect, the present invention provides an article that includes the above-described composition.

In still another aspect, the present invention provides a method of manufacture of an article including the steps of molding, extruding, or shaping the above-described composition into an article.

In yet another aspect, the present invention provides a thermoplastic composition including from 50 to 80 wt. % of a polycarbonate resin; from 2 to 15 wt. % of an impact modifier; from 7.5 to 30 wt. % of a polysiloxane-polycarbonate copolymer having from 8 to 30 wt. % polydimethylsiloxane units or the equivalent molar amount of other diorganosiloxane units; from 1 to 15 wt. % of a phosphorus-containing flame retardant, and from 5 to 15 wt. % of metal fiber, each based on the total combined weight of the thermoplastic composition, exclusive of any filler, wherein a molded sample of the thermoplastic composition having a thickness of 3.0 mm (±10%) has an EMI shielding of at least 20 dB. In an alternative embodiment, a molded sample of the composition is capable of achieving UL94 V0 or V1 rating at a thickness of 1.5 mm (±10%).

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

The present invention provides a flame retardant thermoplastic composition having EMI shielding characteristics, methods of making these compositions and articles that include these compositions. In addition to flame retardancy and EMI shielding, these compositions also offer excellent physical properties. In one aspect, a molded sample of the thermoplastic composition having a thickness of 3.0 mm (±10%) has an EMI shielding of at least 20 dB. In another aspect, a molded sample of the thermoplastic composition is capable of achieving UL94 V0 or V1 rating at a thickness of 1.5 mm (±10%).

Disclosed herein are thermoplastic polycarbonate compositions having improved flame retardance and EMI shielding. Without being bound by theory, it is believed that the favorable results obtained herein are obtained by careful balancing of the relative amounts of a polycarbonate as specified below and an impact modifier as specified below, in combination with a polysiloxane-polycarbonate copolymer as specified below, an organic phosphorus-containing flame retardant and a metal fiber capable of providing electromagnetic interference (EMI) shielding. The compositions can provide an excellent balance of flame retardance and EMI shielding, particularly resistance to burn-through, and favorable physical properties, particularly impact resistance. In another advantageous feature, the melt viscosity of the compositions can be adjusted so as to provide a thin article with improved flame retardance and EMI shielding while maintaining good physical properties.

As used herein, the terms "polycarbonate" and "polycarbonate resin" means compositions having repeating structural carbonate units of the formula (1):

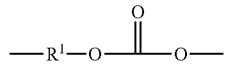

(1)

in which at least 60 percent of the total number of $R^1$ groups are aromatic organic radicals and the balance thereof are aliphatic, alicyclic, or aromatic radicals. Preferably, each $R^1$ is an aromatic organic radical and, more preferably, a radical of the formula (2):

$$-A^1-Y^1-A^2- \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

Polycarbonates can be produced by the interfacial reaction of dihydroxy compounds having the formula HO—$R^1$—OH, which includes dihydroxy compounds of formula (3)

$$\text{HO-}A^1\text{-}Y^1\text{-}A^2\text{-OH} \qquad (3)$$

wherein $Y^1$, $A^1$ and $A^2$ are as described above. Also included are bisphenol compounds of general formula (4):

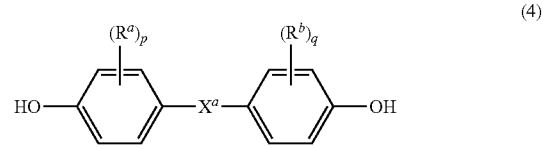

(4)

wherein $R^a$ and $R^b$ each represent a halogen atom or a monovalent hydrocarbon group and may be the same or different; p and q are each independently integers from 0 to 4; and $X^a$ represents one of the groups of formula (5):

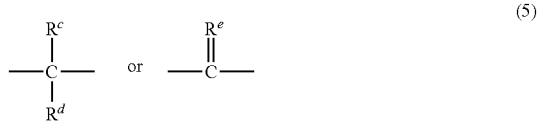

(5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl)phthalimidine, 2-phenyl-3,3-bis-(4-hydroxyphenyl)phthalimidine (PPPBP), and the like, as well as mixtures including at least one of the foregoing dihydroxy compounds.

A nonexclusive list of specific examples of the types of bisphenol compounds that may be represented by formula (3) includes 1,1-bis(4-hydroxyphenyl)methane, 1,1-bis(4-hydroxyphenyl) ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations including at least one of the foregoing dihydroxy compounds may also be used.

It is also possible to employ two or more different dihydroxy compounds or a copolymer of a dihydroxy compounds with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known, and include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl)phenol), 4-chloroformyl phthalic anhydride, trimesic acid, and benzophenone tetracarboxylic acid. The branching agents may be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the thermoplastic composition.

In certain embodiments, the polycarbonates are based on bisphenol A, in which each of $A^1$ and $A^2$ is p-phenylene and $Y^1$ is isopropylidene. In one embodiment, the average molecular weight of the polycarbonate is 5,000 to 100,000. In another embodiment, the average molecular weight of the polycarbonate is 10,000 to 65,000, and in still another embodiment the average molecular weight of the polycarbonate is 15,000 to 35,000.

In one embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of flame retardant articles may have an MVR, measured at 260° C./2.16 Kg, of from 4 to 30 grams per centimeter cubed (g/cm$^3$). Polycarbonates having an MVR under these conditions of from 12 to 30, specifically from 15 to 30 g/cm$^3$ may be useful for the manufacture of articles having thin walls. Mixtures of polycarbonates of different flow properties can be used to achieve the overall desired flow property.

The polysiloxane-polycarbonate copolymers include polycarbonate blocks and polydiorganosiloxane blocks. The polycarbonate blocks include repeating structural units of formula (1) as described above, and in alternative embodiments wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks include repeating structural units of formula (6):

(6)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

D in formula (6) is selected so as to provide an effective level of flame retardance to the thermoplastic composition. The value of D will therefore vary depending on the type and relative amount of each component in the thermoplastic composition, including the type and amount of polycarbonate, impact modifier, polysiloxane-polycarbonate copolymer, and other flame retardants. Suitable values for D may be determined by one of ordinary skill in the art without undue experimentation using the guidelines taught herein. Generally, D has an average value of 2 to 1000, specifically from 10 to 100, more specifically from 25 to 75. In one embodiment, D has an average value of from 40 to 60, and in still another embodiment, D has an average value of 50. Where D is of a lower value, e.g., less than 40, it may be necessary to use a relatively larger amount of the polysiloxane-polycarbonate copolymer. Conversely, where D is of a higher value, e.g., greater than 40, it may be necessary to use a relatively smaller amount of the polysiloxane-polycarbonate copolymer.

In one embodiment the polydiorganosiloxane blocks include repeating structural units of formula (7)

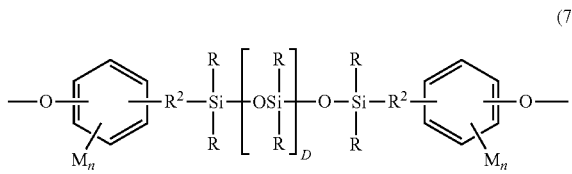

wherein R and D are as defined above.

$R^2$ in formula (7) is a divalent $C_2$-$C_8$ aliphatic group. Each M in formula (7) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (8):

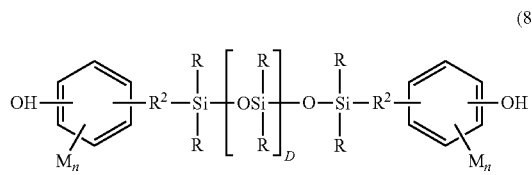

wherein R, D, M, $R^2$, and n are as described above.

Such dihydroxy polysiloxanes can be made by effecting a platinum catalyzed addition between a siloxane hydride of the formula (10),

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures including at least one of the foregoing may also be used.

The polysiloxane-polycarbonate copolymer may be manufactured by reaction of dihydroxy polysiloxane (8) with a carbonate source and a dihydroxy aromatic compound of formula (3), optionally in the presence of a phase transfer catalyst as described above. Suitable conditions are similar to those useful in forming polycarbonates. In one embodiment, the copolymers are prepared by phosgenation, at temperatures from below 0° C. to 100° C., and in alternative embodiments from 25° C. to 50° C. Since the reaction is exothermic, the rate of phosgene addition may be used to control the reaction temperature. The amount of phosgene required will generally depend upon the amount of the dihydric reactants. Alternatively, the polysiloxane-polycarbonate copolymers may be prepared by co-reacting in a molten state, the dihydroxy monomers and a diaryl carbonate ester, such as diphenyl carbonate, in the presence of a transesterification catalyst as described above.

In the production of the polysiloxane-polycarbonate copolymer, the amount of dihydroxy polydiorganosiloxane is selected so as to provide an effective level of flame retardance to the thermoplastic composition. The amount of dihydroxy polydiorganosiloxane will therefore vary depending on desired level of flame retardancy, the value of D, and the type and relative amount of each component in the thermoplastic composition, including the type and amount of polycarbonate, type and amount of impact modifier, type and amount of polysiloxane-polycarbonate copolymer, and type and amount of other flame retardants. Suitable amounts of dihydroxy polydiorganosiloxane can be determined by one of ordinary skill in the art without undue experimentation using the guidelines taught herein. Typically, the amount of dihydroxy polydiorganosiloxane is selected so as to produce a copolymer including from 8 to 40 wt. % of polydimethylsiloxane, or an equivalent molar amount of another polydiorganosiloxane. When less than 8 wt. % of polydimethylsiloxane units is present, adequate flame retardance is not achieved, even if higher amounts of the copolymer are present in the composition. The amount of dihydroxy polydiorganosiloxane may further be selected so as to produce a copolymer including from 15 to 30 wt. % of polydimethylsiloxane, or an equivalent molar amount of another polydiorganosiloxane. Those of ordinary skill in the art using known methods can determine the amount of dimethylsiloxane units in the polysiloxane-polycarbonate copolymer. For example, the weight percent of dimethylsiloxane units in a compound of formula (8) may be determined by comparison of the integrated intensity of the aromatic protons to the protons on the siloxane chains in the $^1$H NMR spectra of a homogenous sample dissolved in CDCl$_3$ (without tetramethylsilane).

The polysiloxane-polycarbonate copolymers used in the present invention have, in one embodiment, a weight-average molecular weight (Mw, measured, for example, by gel permeation chromatography, ultra-centrifugation, or light scattering) of from 10,000 to 200,000. In another embodiment, the polysiloxane-polycarbonate copolymers have a weight-average molecular weight of from 20,000 to 100,000.

The polycarbonate composition further includes an impact modifier to increase its impact resistance. Suitable impact modifiers include an elastomer-modified graft copolymer including (i) an elastomeric (i.e., rubbery) polymer substrate having a Tg below 0° C., more specifically from −40° to −80° C., and (ii) a rigid polymeric superstrate grafted to the elastomeric polymer substrate. As is known, elastomer-modified graft copolymers may be prepared by first providing an elastomeric polymeric backbone. At least one grafting monomer, and in alternative embodiments two monomers, are then polymerized in the presence of the polymer backbone to obtain the graft copolymer.

Depending on the amount of elastomer-modified polymer present, a separate matrix or continuous phase of ungrafted rigid polymer or copolymer may be simultaneously obtained along with the elastomer-modified graft copolymer. Typically, such impact modifiers include from 40 to 95 wt. % elastomer-modified graft copolymer and from 5 to 65 wt. % graft (co)polymer, based on the total weight of the impact modifier. In another embodiment, such impact modifiers include from 50 to 85 wt. %, more specifically from 75 to 85 wt. % rubber-modified graft copolymer, together with from 15 to 50 wt. %, more specifically from 15 to 25 wt. % graft (co)polymer, based on the total weight of the impact modifier. The ungrafted rigid polymers or copolymers may also be separately prepared, for example by radical polymerization, in particular by emulsion, suspension, solution or bulk polymerization, and added to the impact modifier composition or polycarbonate composition. Such ungrafted rigid polymers or copolymers can have number average molecular weights of from 20,000 to 200,000.

Suitable materials for use as the elastomeric polymer backbone include, for example, conjugated diene rubbers; copolymers of a conjugated diene with less than 50 wt. % of a copolymerizable monomer; $C_{1-8}$ alkyl(meth)acrylate elastomers; olefin rubbers such as ethylene propylene copolymers (EPR) or ethylene-propylene-diene monomers (EPDM); silicone rubbers; elastomeric $C_{1-8}$ alkyl(meth)acrylates; elastomeric copolymers of $C_{1-8}$ alkyl(meth)acrylates with butadiene and/or styrene; or combinations including at least one of the foregoing elastomers.

Suitable conjugated diene monomers for preparing the elastomer backbone are of formula (8):

(8)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures including at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, and monomers of formula (9):

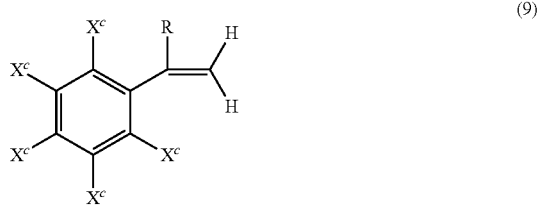

(9)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of the suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, combinations including at least one of the foregoing compounds, and the like. Styrene and/or alpha-methylstyrene are commonly used as monomers copolymerizable with the conjugated diene monomer. Mixtures of the foregoing monovinyl monomers and monovinylaromatic monomers may also be used.

Other monomers that may be copolymerized with the conjugated diene are monovinylic monomers such as itaconic acid, acrylamide, N-substituted acrylamide or methacrylamide, maleic anhydride, maleimide, N-alkyl, aryl or haloaryl substituted maleimide, glycidyl(meth)acrylates, and monomers of the general formula (10):

(10)

wherein R is as previously defined and $X^c$ is cyano, $C_1$-$C_{12}$ alkoxycarbonyl, $C_1$-$C_{12}$ aryloxycarbonyl, or the like. Examples of monomers of formula (10) include acrylonitrile, ethacrylonitrile, methacrylonitrile, alpha-chloroacrylonitrile, beta-chloroacrylonitrile, alpha-bromoacrylonitrile, methyl acrylate, methyl methacrylate, ethyl acrylate, n-butyl acrylate, n-butyl methacrylate, propyl acrylate, isopropyl acrylate, 2-ethylhexyl acrylate, combinations including at least one of the foregoing monomers, and the like. Monomers such as n-butyl acrylate, ethyl acrylate, and 2-ethylhexyl acrylate are commonly used as monomers copolymerizable with the conjugated diene monomer.

Suitable (meth)acrylate rubbers suitable for use as the elastomeric polymer backbone may be cross-linked, particulate emulsion homopolymers or copolymers of $C_{1-8}$ alkyl(meth) acrylates, in particular $C_{4-6}$ alkyl acrylates, optionally in admixture with up to 15 wt. % of comonomers such as styrene, methyl methacrylate, butadiene, isoprene, vinyl methyl ether or acrylonitrile, and mixtures including at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl(meth)acrylate, diallyl maleate, diallyl fumarate, diallyl adipate, triallyl esters of citric acid, triallyl esters of phosphoric acid, and the like, as well as combinations including at least one of the foregoing crosslinking agents.

The elastomeric polymer substrate may be in the form of either a block or random copolymer. The particle size of the substrate is not critical, for example, an average particle size of 0.05 to 8 micrometers, more specifically 0.1 to 1.2 micrometers, still more specifically 0.2 to 0.8 micrometers, for emulsion based polymerized rubber lattices or 0.5 to 10 microns, specifically 0.6 to 1.5 microns, for mass polymerized rubber substrates which also have included grafted monomer occlusions. Particle size may be measured by simple light transmission methods or capillary hydrodynamic chromatography (CHDF). The rubber substrate may be a particulate, moderately cross-linked conjugated diene or $C_{4-6}$ alkyl acrylate rubber, and, in alternative embodiments, has a gel content greater than 70%. Also suitable are mixtures of conjugated diene and $C_{4-6}$ alkyl acrylate rubbers.

In the preparation the elastomeric graft copolymer, the elastomeric polymer backbone may include from 40 to 95 wt. % of the total graft copolymer, more specifically from 50 to 85 wt. %, and even more specifically from 75 to 85 wt. % of the elastomer-modified graft copolymer, the remainder being the rigid graft phase.

The elastomer-modified graft polymers may be polymerized by mass, emulsion, suspension, solution or combined processes such as bulk-suspension, emulsion-bulk, bulk-solution or other techniques, using continuous, semibatch, or batch processes.

In one embodiment, the elastomer-modified graft polymer may be obtained by graft polymerization of a mixture including a monovinylaromatic monomer and optionally one or more comonomers in the presence of one or more elastomeric polymer substrates. The above-described monovinylaromatic monomers may be used in the rigid graft phase, including styrene, alpha-methyl styrene, halostyrenes such as dibromostyrene, vinyltoluene, vinylxylene, butylstyrene, para-hydroxystyrene, methoxystyrene, or combinations including at least one of the foregoing monovinylaromatic monomers. The monovinylaromatic monomers may be used in combination with one or more comonomers, for example the above-described monovinylic monomers and/or monomers of the general formula (10). In one specific embodiment, the monovinylaromatic monomer is styrene or alpha-methyl styrene, and the comonomer is acrylonitrile, ethyl acrylate, and/or methyl methacrylate. In another specific embodiment, the rigid graft phase may be a copolymer of styrene and acrylonitrile, a copolymer of alpha-methylstyrene and acrylonitrile, or a methyl methacrylate homopolymer or copolymer. Specific examples of such elastomer-modified graft copolymers include but are not limited to acrylonitrile-butadiene-styrene (ABS), acrylonitrile-styrene-butyl acrylate (ASA), methyl methacrylate-acrylonitrile-butadiene-styrene (MABS), and methyl methacrylate-butadiene-styrene (MBS), and acrylonitrile-ethylene-propylene -diene-styrene (AES). Acrylonitrile-butadiene-styrene graft copolymers are well known in the art and many are commercially available, including, for example, the high-rubber acrylonitrile-butadiene-styrene resins available from General Electric Company as BLENDEX® grades 131, 336, 338, 360, and 415.

In another embodiment the impact modifier has a core-shell structure wherein the core is an elastomeric polymer substrate and the shell is a rigid thermoplastic polymer that is readily wet by the polycarbonate. The shell may merely physically encapsulate the core, or the shell may be partially or essentially completely grafted to the core. More specifically, the shell comprises the polymerization product of a monovinylaromatic compound and/or a monovinylic monomer or an alkyl(meth)acrylate.

An example of a suitable impact modifier of this type may be prepared by emulsion polymerization and is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate, or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers may be used providing it is free of the alkali metal salts of fatty acids, alkali metal carbonates, and other basic materials. A specific impact modifier of this type is an MBS impact modifier wherein the butadiene substrate is prepared using above-described sulfonates, sulfates, or phosphates as surfactants. It is also beneficial that the impact modifier have a pH of 3 to 8, specifically from 4 to 7.

Another specific type of elastomer-modified impact modifier composition comprises structural units derived from: at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may include, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (9) or (10), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl) methyldimethoxysilane, to afford silicone rubber having an average particle size from 100 nanometers to 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to two micrometers.

The thermoplastic composition may further include other thermoplastic polymers, for example the rigid polymers as described above without the elastomer modification, and/or the elastomers as described above without the rigid polymeric grafts. Suitable rigid thermoplastic polymers generally have a Tg greater than 0° C., preferably greater than 20° C., and include, for example, polymers derived from monovinylaromatic monomers containing condensed aromatic ring structures, such as vinyl naphthalene, vinyl anthracene and the like, or monomers of formula (9), for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl(meth)acrylates; and monomers of the general formula (10), for example acrylonitrile, methyl acrylate and methyl methacrylate; and copolymers of the foregoing, for example styrene-acrylonitrile (SAN), methyl methacrylate-acrylonitrile-styrene, and methyl methacrylate-styrene. These additional thermoplastic polymers may be present in amounts of up to 50 wt. %, specifically from 1 to 35 wt. %, more specifically from 10 to 25 wt. %.

In addition to the foregoing components, the polycarbonate compositions further include a phosphorus containing flame retardant, for example an organic phosphates and/or an organic compound containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

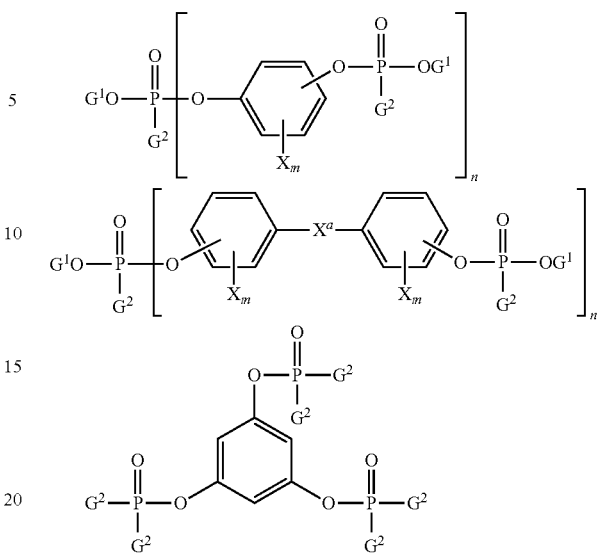

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, (respectively, their oligomeric and polymeric counterparts, and the like. Methods for the preparation of the aforementioned di- or polyfunctional aromatic compounds are described in British Patent No. 2,043,083.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. The organic phosphorus-containing flame-retardants are generally present in amounts of from 0.5 to 20 parts by weight, based on 100 parts by weight of the total composition, exclusive of any filler.

The thermoplastic composition may be essentially free of chlorine and bromine, particularly chlorine and bromine flame-retardants. "Essentially free of chlorine and bromine" as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to 100 parts per million by weight (ppm), less than or equal to 75 ppm, or less than or equal to 50 ppm. When this definition is applied to the fire retardant it is based on the total weight of the fire retardant. When this definition is applied to the thermoplastic composition it is based on the total weight of polycarbonate, polycarbonate-polysiloxane copolymer, impact modifier, fire retardant, and stainless steel fiber.

Optionally, inorganic flame retardants may also be used, for example sulfonate salts such as potassium perfluorobutane sulfonate (Rimar salt) and potassium diphenylsulfone sulfonate; salts formed by reacting for example an alkali metal or alkaline earth metal (preferably lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, $BaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of from 0.01 to 1.0 parts by weight, more specifically from 0.05 to 0.5 parts by weight, based on 100 parts by weight of polycarbonate resin, impact modifier, polysiloxane-polycarbonate copolymer, phosphorus-containing flame retardant, and stainless steel fiber.

Anti-drip agents are also included in the composition, and include, for example fluoropolymers, such as a fibril forming or non-fibril forming fluoropolymer such as fibril forming polytetrafluoroethylene (PTFE) or non-fibril forming polytetrafluoroethylene, or the like; encapsulated fluoropolymers, i.e., a fluoropolymer encapsulated in a polymer as the antidrip agent, such as a styrene-acrylonitrile copolymer encapsulated PTFE (TSAN) or the like, or combinations including at least one of the foregoing antidrip agents. An encapsulated fluoropolymer may be made by polymerizing the polymer in the presence of the fluoropolymer. TSAN may be made by copolymerizing styrene and acrylonitrile in the presence of an aqueous dispersion of PTFE. TSAN may provide significant advantages over PTFE, in that TSAN may be more readily dispersed in the composition. TSAN may, for example, include about 50 wt. % PTFE and about 50 wt. % styrene-acrylonitrile copolymer, based on the total weight of the encapsulated fluoropolymer. The styrene-acrylonitrile copolymer may, for example, be about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or a styrene-acrylonitrile resin as in, for example, U.S. Pat. Nos. 5,521,230 and 4,579,906 to form an agglomerated material for use as an anti-drip agent. Either method may be used to produce an encapsulated fluoropolymer. Antidrip agents are generally used in amounts of from 0.1 to 1.4 parts by weight, based on 100 parts by weight of based on 100 parts by weight of the total composition, exclusive of any filler.

The thermoplastic compositions of the present invention also include EMI shielding characteristics. Accordingly, in another aspect of the present invention, the thermoplastic compositions include a plurality of metal fibers capable of providing EMI shielding characteristics to the thermoplastic composition. In one embodiment, the metal fibers are stainless steel fibers. In alternative embodiments, the metal fibers are aluminum fibers, copper fibers or combinations of stainless steel fibers, aluminum fibers and/or copper fibers.

In addition to the polycarbonate resin, the polycarbonate composition may include various additives ordinarily incorporated in resin compositions of this type. Mixtures of additives may be used. Such additives may be mixed at a suitable time during the mixing of the components for forming the composition.

Suitable fillers or reinforcing agents include, for example, $TiO_2$; fibers, such as asbestos, carbon fibers, or the like; silicates and silica powders, such as aluminum silicate (mullite), synthetic calcium silicate, zirconium silicate, fused silica, crystalline silica graphite, natural silica sand, or the like; boron powders such as boron-nitride powder, boron-silicate powders, or the like; alumina; magnesium oxide (magnesia); calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres),or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; glass fibers, (including continuous and chopped fibers), such as E, A, C, ECR, R, S, D, and NE glasses and quartz, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations including at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of from 1 to 50 parts by weight, based on 100 parts by weight of the total composition.

Suitable heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Suitable antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

Suitable light stabilizers include, for example, benzotriazoles such as 2-(2-hydroxy-5-methylphenyl)benzotriazole, 2-(2-hydroxy-5-tert-octylphenyl) -benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Suitable plasticizers include, for example, phthalic acid esters such as dioctyl-4,5-epoxy-hexahydrophthalate, tris-(octoxycarbonylethyl)isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Suitable antistatic agents include, for example, glycerol monostearate, sodium stearyl sulfonate, sodium dodecylbenzenesulfonate or the like, or combinations of the foregoing antistatic agents. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of from 0.1 to 3.0 parts by weight based on 100 parts by weight the total composition, excluding any filler.

Suitable mold releasing agents include for example, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Suitable UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy) -phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl] propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight based on 100 parts by weight of the total composition, excluding any filler.

Suitable lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates; sulfates and chromates; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations including at least one of the foregoing pigments. Pigments are generally used in amounts of from 1 to 10 parts by weight, based on 100 parts by weight based on 100 parts by weight of the total composition, excluding any filler.

Suitable dyes include, for example, organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t -butylphenyl)-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a) phenoxazonium perchlorate; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-diethylamino-4-methylcoumarin; 7-diethylamino-4-trifluoromethylcoumarin; 2,2'-dimethyl-p-quaterphenyl; 2,2-dimethyl-p-terphenyl; 7-ethylamino-6-methyl-4- trifluoromethylcoumarin; 7-ethylamino-4-trifluoromethylcoumarin; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, or combinations including at least one of the foregoing dyes. Dyes are generally used in amounts of from 0.1 to 5 parts by weight, based on 100 parts by weight of the total composition, excluding any filler.

Suitable colorants include, for example titanium dioxide, anthraquinones, perylenes, perinones, indanthrones, quinacridones, xanthenes, oxazines, oxazolines, thioxanthenes, indigoids, thioindigoids, naphthalimides, cyanines, xanthenes, methines, lactones, coumarins, bis-benzoxazolylthiophene (BBOT), napthalenetetracarboxylic derivatives, monoazo and disazo pigments, triarylmethanes, aminoketones, bis(styryl)biphenyl derivatives, and the like, as well as combinations including at least one of the foregoing colorants. Colorants are generally used in amounts of from 0.1 to 5 parts by weight, based on 100 parts by weight of the total composition, excluding any filler.

Suitable blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

Additionally, materials to improve flow and other properties may be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

Examples of commercially suitable low molecular weight hydrocarbon resins derived from petroleum $C_5$ to $C_9$ feedstock include the following: hydrocarbon resins available from Eastman Chemical under the trademark Piccotac®, the aromatic hydrocarbon resins available from Eastman Chemical under the trademark Picco®, the fully hydrogenated alicyclic hydrocarbon resin based on $C_9$ monomers available from Arakawa Chemical Inc. under the trademark ARKON® and sold, depending on softening point, as ARKON® P140, P125, P115, P100, P90, P70 or the partially hydrogenated hydrocarbon resins sold as ARKON® M135, M115, M100 and M90, the fully or partially hydrogenated hydrocarbon resin available from Eastman Chemical under the tradename REGALITE® and sold, depending on softening point, as REGALITE® R1100, S1100, R1125, R1090 and R1010, or the partially hydrogenated resins sold as REGALITE® R7100, R9100, S5100 and S7125, the hydrocarbon resins available from Exxon Chemical under the trade ESCOREZ®, sold as the ESCOREZ® 1000, 2000 and 5000 series, based on C5, C9 feedstock and mixes thereof, or the hydrocarbon resins sold as the ESCOREZ® 5300, 5400 and 5600 series based on cyclic and C9 monomers, optionally hydrogenated and the pure aromatic monomer hydrocarbon resins such as for instance the styrene, α-methyl styrene based hydrocarbon resins available from Eastman Chemical under the tradename Kristalex®. Low molecular weight hydrocarbon resins are generally used in amounts of from 0.1 to 10 parts by weight, based on 100 parts by weight of the total composition, excluding any filler.

The thermoplastic compositions can be manufactured by methods known in the art, for example in one embodiment, in one manner of proceeding, powdered polycarbonate resin, impact modifier, polydiorganosiloxane-polycarbonate copolymer, and/or other optional components are first blended, optionally with chopped glass strands or other filler in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets so prepared when cutting the extrudate may be one-fourth inch long or less as desired. Such pellets may be used for subsequent molding, shaping, or forming.

As noted above, it is particularly challenging to achieve excellent flame retardancy while not adversely affecting the desirable physical properties of the compositions, in particular impact strength. In addition, it is particularly challenging to achieve excellent EMI shielding while not adversely affecting the flame retardancy properties of the compositions, in particular impact strength. It has been found by the inventors hereof that flame retardant compositions having good physical properties, excellent flame retardance in the absence of a brominated or chlorinated flame retardant, and good EMI shielding properties are obtained by careful balancing of the relative amounts of the above-described polycarbonates, impact modifiers, polysiloxane-polycarbonate copolymers, organic phosphorus-containing flame retardants, and metal fibers capable of providing EMI shielding to the composition.

In particular, in one embodiment, the thermoplastic composition includes from 20 to 90 wt. % of the polycarbonate resin; from 1 to 35 wt. % of the impact modifier (when present); from 0.5 to 30 wt. % of the polysiloxane-polycarbonate copolymer including from 8 to 30 wt. % dimethylsiloxane units, or the equivalent molar amount of other diorganosiloxane units; from 0.5 to 20 wt. % of an organic phosphorus containing flame retarding agent; and from 3 to 30 wt. % of metal fiber, each based on the total combined weight of the composition, excluding any filler. Amounts outside of these ranges result in compositions that have one or more of decreased flame retardance; decreased notched Izod impact strength at ambient temperature; decreased notched Izod impact strength at low temperatures; and/or decreased heat deflection temperature.

In another embodiment, the thermoplastic composition includes from 50 to 80 wt. % of the polycarbonate resin; from 2 to 15 wt. % of the impact modifier; from 7.5 to 30 wt. % of the polysiloxane-polycarbonate copolymer including from 8 to 30 wt. % dimethylsiloxane units, or the equivalent molar amount of other diorganosiloxane units, from 1 to 15 wt. % of an organic phosphorus containing flame retarding agent, and from 5 to 15 wt. % of stainless steel fiber, each based on the total combined weight of the composition, excluding any filler. These amounts provide optimal flame retardance, together with optimal notched Izod impact strength at ambient temperature; optimal notched Izod impact strength at low temperature; improved mechanical property retention (such as impact and tensile) on thermal aging and/or over extended periods of time; and/or optimal heat deflection temperature. Molded samples of the thermoplastic compositions of the invention retain at least 50%, specifically at least 70%, more specifically at least 90%, of their tensile strength after 8000 hours in an oven at 90° C., when measured according to ASTM D638. Molded samples of the thermoplastic compositions of the invention also retain at least 50%, specifically at least 70%, more specifically at least 90%, of their tensile strength after 8000 hours in an oven at 95° C., when measured according to ASTM D638. Molded samples of the thermoplastic compositions of the invention retain at least 50% of their impact strength after 8000 hours in an oven at 90° C., when measured according to ISO 8256 (Method A). Molded samples of the thermoplastic compositions having a thickness of 3.0 mm (±10%) also exhibit an EMI shielding of at least 20 dB.

Relative amounts of each component and their respective composition may be determined by methods known to those of ordinary skill in the art, for example, proton nuclear magnetic resonance spectroscopy ($^1$H NMR), $^{13}$C NMR, X-ray fluorescence, high resolution mass spectroscopy, Fourier transform infrared spectroscopy, gas chromatography-mass spectroscopy, and the like.

In one embodiment, the improved flame retardancy of the thermoplastic compositions is reflected in a longer time to through-hole (TTH). It has been found that a useful measure of flame retardancy is the length of time required to burn a hole through a sample upon the repeated application of a flame. Thin samples often have a much shorter time to through-hole, and thus represent a particular challenge to achieving excellent flame retardancy. The above-described compositions have longer through-hole times, and are thus more flame retardant than prior art compositions. In a test where a 5-inch (127 mm) flame with an inner blue cone of 1.58 inches (40 mm) is applied to a plaque for five seconds, removed for five seconds, applied for five seconds, and so on until a through-hole appears, a 3-mm (±10%) plaque has a TTH of from 30 to 125 seconds, specifically greater than 50 seconds, and more specifically greater than 55 seconds. In another embodiment, a 2.5-mm (±10%) plaque has a TTH of from 35 to 90 seconds, specifically greater than 50 seconds, more specifically greater than 55 seconds.

In another embodiment, the thermoplastic compositions are of particular utility in the manufacture flame retardant articles that pass the UL94 vertical burn tests, in particular the UL94 5VA standard, which is more stringent than the UL94 5VB standard. In the UL94 vertical burn test, a flame is applied to a vertically fastened test specimen placed above a cotton wool pad. To achieve a rating of 5VB, burning must stop within 60 seconds after five applications of a flame to a test bar, and there can be no drips that ignite the pad. To achieve a rating of 5VA a sample must pass 5VB, and in addition flat plaque specimens may not have a burn-through, i.e., cannot form a hole. The above-described compositions can meet the UL94 5VB standard and/or the UL94 5VA standard.

Thin articles present a particular challenge in the UL94 tests, because compositions suitable for the manufacture of thin articles tend to have a higher flow. Thus, thermoplastic compositions suitable for the manufacture of a variety of articles will generally have a melt volume rate (MVR) of from 4 to 30 g/10 minutes measured at 260° C./2.16 kg in accordance with ASTM D1238. Within this range, for thin wall applications, the MVR may be adjusted, in one embodiment, to greater than 8, greater than 10 in another embodiment, and greater than 13 g/10 minutes in still another embodiment, measured at 260° C./2.16 kg in accordance with ASTM D1238.

Melt viscosity can provide an alternative indication flow. Thermoplastic compositions as described herein suitable for the manufacture of thin articles may have a melt viscosity at 260° C./1500 sec$^{-1}$ of from 50 to 500 Pascal-second, measured in accordance with ISO 11443.

Flame retardance of the samples is excellent. It has been found that in one embodiment, a sample having a thickness of 2.25 to 2.90 mm (±10%) passes the UL94 5VB standard. In another embodiment, a sample having a thickness of 2.4 to 2.75 mm (±10%) passes the UL94 5VB standard. In another embodiment, a sample having a thickness of 2.40 to 2.60 mm (±10%) passes the UL94 5VB standard. In still another embodiment, a sample having a thickness of 2.50 mm (±10%) passes the UL94 5VB standard.

In test specimens made from compositions suitable for the formation of thin materials, application of the flame in the UL94 vertical burn test often leads to the dripping of flaming polymer material and the ignition of the cotton wool pad mounted below the rod. The thinness of the plaque and the higher flow properties of polycarbonate compositions used to make thin materials also tend to lead to burn-through. An advantage of the present compositions is that in one embodiment, very thin samples, that is, samples having thickness even as low as 0.1 mm (±10%) may pass the UL94 5VA standard, particularly if factors such sample preparation (for example annealing and/or molding conditions), as well as other factors taught herein are carefully controlled. In another embodiment, a sample having a thickness as low as 0.5 mm (±10%) may pass the UL94 5VA standard. In still another embodiment, a sample having a thickness as low as 1.0 mm (±10%) may pass the UL94 5VA standard. In other embodiments, a sample having a thickness as low as 2.0 mm (±10%) may pass the UL94 5VA standard. In still other embodiments, a sample having a thickness of 2.25 to 2.90 mm (±10%) passes the UL94 5VA standard. In another embodiment, a sample having a thickness of 2.4 to 2.75 mm (±10%) passes the UL94 5VA standard. In another embodiment, a sample having a thickness of 2.40 to 2.60 mm (±10%) passes the UL94 5VA standard. In still another embodiment, a sample having a thickness of 2.50 mm (±10%) passes the UL94 5VA standard.

In another aspect, the UL94 standard utilizes a rating of V0 or V1, wherein a rating of V0 is better than V1. Using this standard, the thermoplastic compositions are formed into a molded article having a given thickness. As with the UL94 5VA standard, the thinner the article, the more difficult it is to achieve a rating of V0 or V1. In one embodiment, a molded sample of the thermoplastic composition is capable of achieving UL94 V0 or V1 rating at a thickness of 1.5 mm (±10%). In another embodiment, a molded sample of the thermoplastic composition is capable of achieving UL94 V0 or V1 rating at a thickness of 1.2 mm (±10%). In still another embodiment, a molded sample of the thermoplastic composition is capable of achieving UL94 V0 or V1 rating at a thickness of 1.0 mm (±10%). In yet another embodiment, a molded sample of the thermoplastic composition is capable of achieving UL94 V0 or V1 rating at a thickness of 0.8 mm (±10%).

The thermoplastic compositions may further have a heat deflection temperature (HDT) from 65 to 110° C., specifically from 70 to 105° C., measured according to ISO 75/Ae at 1.8 MPa using 4 mm (±3%) thick testing bar.

The thermoplastic compositions may further have a Notched Izod Impact (NII) of from 3 to 18 ft-lb/inch, or from 3 to 14 ft-lb/inch, measured at room temperature using ⅛-inch (3.18 mm) (±3%) bars in accordance with ASTM D256.

The thermoplastic compositions may further have a Notched Izod Impact (NII) of from 6 to 18 ft-lb/inch, or from 6 to 14 ft-lb/inch, measured at 10° C. using ⅛-inch (3.18 mm) (±3%) bars in accordance with ASTM D256. Ductility (at a certain temperature, such as 0 or 23° C.) is reported as the percentage of five samples that, upon failure in the impact test, exhibited a ductile failure rather than rigid failure.

The thermoplastic compositions may further have tensile properties, such as Tensile Strength of from 50 to 70 MPa and Tensile Elongation at break of from 30% to 120%. Tensile Strength and Tensile Elongation at Break were determined using Type I 3.2 mm thick molded tensile bars tested per ASTM D638 at a pull rate of 1 mm/min. until 1% strain, followed by a rate of 50 mm/min. until the sample broke. It is also possible to measure at 5 mm/min. if desired for the specific application, but the samples measured in these experiments were measured at 50 mm/min. Tensile Strength and Tensile Modulus results are reported as MPa, and Tensile Elongation at Break is reported as a percentage.

Shaped, formed, or molded articles including the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, hand held electronic device housings such as housings for cell phones, electrical connectors, and components of lighting fixtures, ornaments, home appliances, roofs, greenhouses, sun rooms, swimming pool enclosures, and the like. The above-described compositions are of particular utility in the manufacture of articles including a minimum wall thickness of as low as 0.1 mm, 0.5 mm, 1.0 mm, or 2.0 mm (each ±10%). The above-described compositions are also of particular utility in the manufacture of articles including a minimum wall thickness of 2.25 to 2.90 mm (each ±10%), in an alternative embodiment 2.4 to 2.75 mm (each ±10%), and in another embodiment, 2.40 to 2.60 mm (each ±10%). Minimum wall thicknesses of 2.25 to 2.50 mm (each ±10%) may also be manufactured.

The compositions of the present invention are especially useful in electronic applications wherein flame retardance and EMI shielding are beneficial. Examples of such applications include, but are not limited to, housings or enclosures for electrical and/or electronic devices, such as projectors, mobile phones, DVD players, digital cameras, car navigating systems, routers, etc. or as a jacket or coating for cable, such as LAN cable.

The present invention is further illustrated by the following non-limiting examples. The following components were used:

EXAMPLES

A first set of experiments was performed to show the effects of adding varying amounts of stainless steel fiber to a polycarbonate-based mixture. The polycarbonate-based mixture was a Cycoloy™ resin, Grade CX7240 available from General Electric Company (Pittsfield, Mass.). The Cycoloy™ CX7240 resin included 71.5 wt. % polycarbonate, 12.6 wt. % polycarbonate-polysiloxane copolymer (PC-ST), 3.0 wt. % ABS, and 10 wt. % benzenepropanoic acid, 3,5-bis (1,1-dimethylethyl)-4-hydroxy-2-[3-[3,5-bis(1,1 dimethylethyl)-4-hydroxyphenyl]-1-oxopropyl]hydrazide (BDADP). As the amounts of stainless steel fiber were increased, the respective amounts of the PC, PC-ST, ABS and BDADP decreased, although the ratios between each remained the same.

For these experiments, the ingredients were formed using an extruder. The extruder was a Toshiba 2-lobe TEM-37BS (twin screw extruder in 37 mm diameter). All the components were put into upstream on the extruder except the metal fiber, which was added downstream at a melt temperature range of 270-290 C. The compositions were subsequently molded at a temperature of 285 C for EMI shielding effect testing specimen and mechanical testing parts on a Nissei ES3000 injection machine. Bars for flame testing were injection molded at a temperature of 250° C. on a Nissei UH1000. As to the testing procedures, the EMI shielding test was based on ASTM D-4935 standard, impact on ASTM D256 standard and flame performance on UL94 standard. The results of these experiments can be seen in Table 1. As may be seen, as the level of stainless steel fiber is increased, the EMI shielding is increased. Nevertheless, flame retardancy can also be maintained up to levels of approximately 11.3% metal fiber even though metal fiber generally decreases the flame retardancy of a material. In addition, the HDT of the materials is increased.

TABLE 1

Effect of stainless steel fiber

| | Cycoloy CX7240 | | | | | | |
|---|---|---|---|---|---|---|---|
| | | | | Sample No. | | | |
| | Reference | 1# | 2# | 3# | 4# | 5# | 6# |
| Components | | | | | | | |
| Polycarbonate | 71.5 | 68.0 | 64.4 | 62.6 | 60.8 | 57.2 | 52.6 |
| PC-ST | 12.6 | 13.3 | 12.6 | 12.3 | 11.9 | 11.2 | 10.5 |
| ABS | 3.0 | 2.9 | 2.7 | 2.6 | 2.6 | 2.4 | 2.3 |
| BPADP | 10.0 | 9.5 | 9.0 | 8.8 | 8.5 | 8.0 | 8.5 |
| Stainless Steel Fiber | 0.0 | 3.8 | 7.5 | 9.4 | 11.3 | 15.0 | 18.8 |
| Properties | | | | | | | |
| EMI Shielding @ 3 mm, dB | 0 | 8 | 28 | 37 | 45 | 56 | 59 |
| HDT, deg. C. | 93 | 99 | 100 | 99 | 100 | 99 | 101 |
| NII, 23 deg. C. | 700 | 75 | 63 | 65 | 56 | 43 | 46 |
| Impact, Un-notched, J/m | — | 1060 | 697 | 681 | 517 | 510 | 433 |
| MVR, cm3/10 min | — | 80.3 | 47.8 | 39.2 | 33.7 | 21.3 | 14.8 |
| Flame Retardancy | | | | | | | |
| Pftp - 1.5 mm (V0) | 1 | 1 | 1 | 1 | 0.8 | 0.2 | 0.005 |

In the next set of experiments, varying amounts of stainless steel fiber and BDADP were used, in addition to varying amounts of PC, PC-ST and ABS to determine the ability of the materials to satisfy V0 at 1.5 mm. In these experiments, the materials were formed and tested using the same equipment and testing procedures as set forth in the first set of experiments. As may be seen from these examples, the Pftp (Percentage of first time pass) was 0.75 or higher for all samples, meaning that all the materials were capable of achieving UL94 V0 rating at a thickness of 1.5 mm (±10%) or less 75% of the time. In beneficial embodiments, the compositions exhibited a Pftp of at least 80% and in select embodiments, the compositions exhibited a Pftp of at least 90%. Nevertheless, by varying the levels of metal fiber, BDADP, PC-ST and ABS, different properties could be achieved.

TABLE 2

| | Sample No. | | | | | | |
|---|---|---|---|---|---|---|---|
| | 1# | 2# | 3# | 4# | 5# | 6# | 7# |
| Components | | | | | | | |
| Polycarbonate | 67.8 | 60.8 | 54.8 | 59.2 | 51.8 | 51.8 | 51.3 |
| PC-ST | 13.01 | 8 | 16 | 9.74 | 12 | 12 | 12 |
| ABS | 0 | 0 | 0 | 2.55 | 0 | 10 | 7 |
| BPADP | 8 | 15 | 8 | 13 | 15 | 15 | 13.5 |
| Stainless Steel Fiber | 7.5 | 11.3 | 15.0 | 10.5 | 15.0 | 7.5 | 11.3 |
| Properties | | | | | | | |
| EMI Shielidng@3 mm/dB | 21 | 56 | 50 | 47 | 61 | 40 | 50 |
| HDT, deg. C. | 102 | 83.6 | 99.3 | 88.1 | 82.9 | 80.9 | 85 |
| NII, 23 deg. C. | 60.7 | 31.6 | 57.4 | 37.4 | 36.3 | 39 | 44.7 |
| Impact, Un-notched/J/m | 901 | 313 | 544 | 385 | 280 | 241 | 302 |
| MVR, cm3/10 min | 56.5 | 62.8 | 17.5 | 74.8 | 22 | 124.7 | 60.6 |
| Flame Retardancy | | | | | | | |
| Pftp-1.5 mm (V0) | 1 | 1 | 0.75 | 0.99 | 1 | 0.98 | 0.76 |

In the next set of experiments, the synergistic effects of the polysiloxane-polycarbonate copolymer and the phosphorous-based flame retardant were examined. As may be seen in Table 3, sample 5 is a comparison trial without the polysiloxane-polycarbonate copolymer. When the results of sample 4 are compared with the results of sample 5, it was shown that the notched izod impact (NII) was significantly increased from 33.3 to 56 J/m by adding PC-ST, while the flame retardancy was also improved from a 0.59 Pftp to a Pftp of 0.8.

Sample 6 is comparison trial without the phosphorous-based flame retardant. When sample 6 is compared to sample 4, it is evident that by adding BPADP, the flame retardancy was significantly improved from a 0 Pftp to a Pftp of 0.8, while the EMI shielding effect also increased from 32 to 46 dB. It is presumed that the phosphorous-based flame retardant reduces the share on the steel fiber, thereby leading to an improved conductive network and a higher shielding effect. Therefore, as may be seen, there is a synergistic aspect of compositions including both the phosphorous-based flame retardant and the polysiloxane-polycarbonate copolymer which results in compositions having improved EMI shielding, impact resistance, and flame retardancy characteristics.

TABLE 3

| | Sample No. | | | | | | |
| --- | --- | --- | --- | --- | --- | --- | --- |
| | Reference | 1# | 2# | 3# | 4# | 5# | 6# |
| Components | | | | | | | |
| Polycarbonate | 71.5 | 68.0 | 64.4 | 62.6 | 60.8 | 72.7 | 69.3 |
| PC-ST | 12.6 | 13.3 | 12.6 | 12.3 | 11.9 | 0 | 11.9 |
| ABS | 3.0 | 2.9 | 2.7 | 2.6 | 2.6 | 2.6 | 2.6 |
| BPADP | 10.0 | 9.5 | 9.0 | 8.8 | 8.5 | 8.5 | 0 |
| Stainless Steel Fiber | 0.0 | 3.8 | 7.5 | 9.4 | 11.3 | 11.3 | 11.3 |
| Properties | | | | | | | |
| EMI Shielidng@3 mm, dB | 0 | 8 | 28 | 37 | 45 | 43 | 32 |
| HDT, deg. C. | 93 | 99 | 100 | 99 | 100 | 99.3 | 125 |
| NII, 23 deg. C. | 700 | 75 | 63 | 65 | 56 | 33.3 | 89.1 |
| Impact, Un-notched, J/m | — | 1060 | 697 | 681 | 517 | 612 | 1370 |
| MVR, cm3/10 min | | 80.3 | 47.8 | 39.2 | 33.7 | 50.3 | 16.4 |
| Flame Retardancy | | | | | | | |
| Pftp-1.5 mm (V0) | 1 | 1 | 1 | 1 | 0.8 | 0.59 | 0 |

In the next set of experiments, the properties of the materials of the present invention were compared to a commercially available polycarbonate-based flame-retardant material (PCA-S-1003 FR available from General Electric Company). PCA-S-1003 FR is a polycarbonate-based material that includes an impact modifier and stainless steel fiber. As may be seen, PCA-S-1003 FR also includes a phosphorous-based flame retardant (RDP—resorcinol diphosphate), but does not include the polycarbonate-polysiloxane copolymer (PC-ST). While both materials showed EMI shielding above 40 dB, the materials of the present invention had higher physical properties (HDT and notched izod (NII) strength) and the compositions of the present invention were capable of achieving UL94 V0 rating at a thickness of 1.5 mm (±10%) while the PCA-S-1003 FR was capable of achieving UL94 V0 rating only at a thickness of 3.0 mm (±10%). Accordingly, the results of this experiment (which are set forth in Table 4) demonstrate that simply adding a phosphorous-based flame retardant and a metal fiber do not necessarily result in a material providing effective EMI shielding and a material capable of achieving UL94 V0 rating at a thickness of 1.5 mm (±10%).

TABLE 4

| | Sample No. | |
| --- | --- | --- |
| | Example of this disclosure | Commerical PCA-S-1003 FR |
| Components | | |
| Polycarbonate | 60.8 | 68.3 |
| PC-ST | 11.9 | 0.0 |
| Impact Modifier (ABS, SAN or BD) | 2.6 | 8.7 |
| BPADP | 8.5 | 0.0 |
| RDP | 0.0 | 6.8 |
| Stainless Steel Fiber | 11.3 | 11.4 |
| Properties | | |
| EMI Shielidng@3 mm/dB | 47.2 | 44.0 |
| HDT, deg. C. | 101.0 | 98.8 |
| NII, 23 deg. C. | 6.4 | 3.6 |
| Flame Retardancy | | |
| UL V0@ | 1.5 mm | 3.0 mm |

The next set of experiments, however, was designed to show that other phosphorous-based flame retardants could be used in the present invention to still achieve selected EMI shielding and flame retardancy properties. In these experiments, the BPADP was replaced with RDP. As may be seen in Table 5, the compositions including the RDP still provided selected EMI shielding and flame retardancy properties.

TABLE 5

| | Sample No. | |
| --- | --- | --- |
| | 1# | 2# |
| Components | | |
| Polycarbonate | 60.8 | 60.8 |
| PC-ST | 11.9 | 11.9 |
| Clear Exl (another PC-ST) | | |
| ABS | 2.6 | 2.6 |
| Acrylic polymer impact modifier | | |
| BPADP | 8.5 | |
| RDP | | 8.5 |
| Stainless Steel Fiber | 11.3 | 11.3 |
| Properties | | |
| EMI Shielidng@3 mm, dB | 45 | 43 |
| HDT, deg. C. | 100 | 92 |

TABLE 5-continued

| | Sample No. | |
|---|---|---|
| | 1# | 2# |
| NII, 23 deg. C. | 56 | 54 |
| Impact, Un-notched, J/m | 517 | 497 |
| MVR, cm3/10 min | 33.7 | 40.6 |
| Flame Retardancy | | |
| Pftp-1.5 mm (V0) | 0.8 | 1 |

The singular forms "a," "an," and "the" include plural referents unless the context clearly dictates otherwise. Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs. The endpoints of all ranges directed to the same property or amount are independently combinable and inclusive of the endpoint. The modifier "about" used in connection with a quantity is inclusive of the stated value, and has the meaning dictated by the context, for example the degree of error associated with measurement of the particular quantity. Where a measurement is followed by the notation "(±10%)" or "(±3%)", the measurement may vary within the indicated percentage either positively or negatively. This variance may be manifested in the sample as a whole (e.g., a sample that has a uniform width that is within the indicated percentage of the stated value), or by variation(s) within the sample (e.g., a sample having a variable width, all such variations being within the indicated percentage of the stated value).

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A thermoplastic composition, comprising:
   from 40 to 90 wt. % of a polycarbonate resin;
   from 1 to 35 wt. % of an impact modifier;
   from 0.5 to 30 wt. % of a polysiloxane-polycarbonate copolymer comprising from 8 to 30 wt. % polydimethylsiloxane units or the equivalent molar amount of other diorganosiloxane units;
   from about 8.0 to about 15.0 wt. % of a phosphorus-containing flame retardant, wherein the phosphorus-containing flame retardant comprises resorcinol tetraphenyl diphosphate or bisphenol A bis(diphenyl)phosphate; and
   from 5 to 20 wt. % of metal fiber, each based on the total combined weight of the thermoplastic composition,
   wherein a molded sample of the thermoplastic composition having a thickness of 3.0 mm (±10%) has an EMI shielding of at least 20 dB and wherein a molded sample of the thermoplastic composition is capable of achieving UL94 V0 or V1 rating at a thickness of 1.5 mm (±10%).

2. The composition of claim 1, wherein the impact modifier comprises an ASA impact modifier, a diene impact modifier, an organosiloxane impact modifier, an organosiloxane-branched acrylate impact modifier, an EPDM impact modifier, a styrene-butadiene-styrene impact modifier, a styrene-ethylene-butadiene-styrene impact modifier, an ABS impact modifier, an MBS impact modifier, a glycidyl ester impact modifier, or a combination comprising at least one of the foregoing impact modifiers.

3. The composition of claim 1, wherein the impact modifier comprises an ABS impact modifier.

4. The composition of claim 1, further comprising from 0.1 to 10 wt. % of a filler, an antidrip agent, a heat stabilizer, a light stabilizer, an antioxidant, a plasticizer, an antistat agent, a mold release agent, a UV absorber, a lubricant, a pigment, a dye, a colorant, a low molecular weight hydrocarbon resin, or combinations of two or more of the foregoing.

5. The composition of claim 1, wherein the metal fiber is selected from stainless steel fiber, aluminum fiber, copper fiber, or a combination of two or more of the foregoing fibers.

6. The composition of claim 1, wherein a molded sample of the thermoplastic composition is capable of achieving UL94 V0 or V1 rating at a thickness of 1.2 mm (±10%).

7. The composition of claim 1, wherein a molded sample of the thermoplastic composition is capable of achieving UL94 V0 or V1 rating at a thickness of 1.0 mm (±10%).

8. The composition of claim 1, wherein a molded sample of the thermoplastic composition is capable of achieving UL94 V0 or V1 rating at a thickness of 0.8 mm (±10%).

9. A thermoplastic composition, comprising:
   from 50 to 80 wt. % of a polycarbonate resin;
   from 2 to 15 wt. % of an ABS impact modifier made by a bulk or solution polymerization process;
   from 7.5 to 30 wt. % of a polysiloxane-polycarbonate copolymer comprising from 8 to 30 wt. % polydimethylsiloxane units or the equivalent molar amount of other diorganosiloxane units;
   from about 8 to about 15 wt. % of a phosphorus-containing flame retardant, wherein the phosphorus-containing flame retardant comprises resorcinol tetraphenyl diphosphate or bisphenol A bis(diphenyl)phosphate; and
   from 7 to 15 wt. % of metal fiber, each based on the total combined weight of the thermoplastic composition,
   wherein a molded sample of the thermoplastic composition having a thickness of 3.0 mm (±10%) has an EMI shielding of at least 20 dB and wherein a molded sample of the thermoplastic composition is capable of achieving UL94 V0 or V1 rating at a thickness of 1.5 mm (±10%).

10. The composition of claim 9, further comprising from 0.1 to 10 wt. % of a filler, an antidrip agent, a heat stabilizer, a light stabilizer, an antioxidant, a plasticizer, an antistat agent, a mold release agent, a UV absorber, a lubricant, a pigment, a dye, a colorant, a low molecular weight hydrocarbon resin, or combinations of two or more of the foregoing.

11. The composition of claim 9, wherein the metal fiber is selected from stainless steel fiber, aluminum fiber, copper fiber, or a combination of two or more of the foregoing fibers.

12. The composition of claim 9, wherein a molded sample of the thermoplastic composition is capable of achieving UL94 V0 or V1 rating at a thickness of 1.2 mm (±10%).

13. The composition of claim 9, wherein a molded sample of the thermoplastic composition is capable of achieving UL94 V0 or V1 rating at a thickness of 1.0 mm (±10%).

14. The composition of claim 9, wherein a molded sample of the thermoplastic composition is capable of achieving UL94 V0 or V1 rating at a thickness of 0.8 mm (±10%).

15. An article of manufacture comprising the composition of claim 1.

16. The article of claim 15, wherein the article comprises a molded article having a wall thickness of 1.5 mm or less.

17. An article of manufacture comprising the composition of claim 9.

18. The article of claim 17, wherein the article comprises a molded article having a wall thickness of 1.5 mm or less.

19. A method of forming a thermoplastic composition comprising the step of:
   blending in an extruder:
   a) from 20 to 90 wt. % of a polycarbonate resin;
   b) from 1 to 35 wt. % of an impact modifier;
   c) from 0.5 to 30 wt. % of a polysiloxane-polycarbonate copolymer comprising from 8 to 30 wt. % polydimethylsiloxane units or the equivalent molar amount of other diorganosiloxane units;
   d) from about 8 to about 15 wt. % of a phosphorus-containing flame retardant, wherein the phosphorus-containing flame retardant comprises resorcinol tetraphenyl diphosphate or bisphenol A bis(diphenyl) phosphate; and
   e) from 5 to 20 wt. % of metal fiber, each based on the total combined weight of the thermoplastic composition,
   wherein a molded sample of the thermoplastic composition having a thickness of 3.0 mm (±10%) has an EMI shielding of at least 20 dB and wherein a molded sample of the thermoplastic composition is capable of achieving UL94 V0 or V1 rating at a thickness of 1.5 mm (±10%).

20. The method of claim 19, wherein the impact modifier comprises an ASA impact modifier, a diene impact modifier, an organosiloxane impact modifier, an organosiloxane-branched acrylate impact modifier, an EPDM impact modifier, a styrene-butadiene-styrene impact modifier, a styrene-ethylene-butadiene-styrene impact modifier, an ABS impact modifier, an MBS impact modifier, a glycidyl ester impact modifier, or a combination comprising at least one of the foregoing impact modifiers.

21. The method of claim 19, wherein the impact modifier comprises an ABS impact modifier.

22. The method of claim 19, further comprising from 0.1 to 10 wt. % of a filler, an antidrip agent, a heat stabilizer, a light stabilizer, an antioxidant, a plasticizer, an antistat agent, a mold release agent, a UV absorber, a lubricant, a pigment, a dye, a colorant, a low molecular weight hydrocarbon resin, or combinations of two or more of the foregoing.

23. The method of claim 19, wherein the metal fiber is selected from stainless steel fiber, aluminum fiber, copper fiber, or a combination of two or more of the foregoing fibers.

24. A thermoplastic composition, comprising:
   from 50 to 80 wt. % of a polycarbonate resin;
   from 2 to 15 wt. % of an ABS impact modifier made by a bulk or solution polymerization process;
   from 7.5 to 30 wt. % of a polysiloxane-polycarbonate copolymer comprising from 8 to 30 wt. % polydimethylsiloxane units or the equivalent molar amount of other diorganosiloxane units;
   from about 8 to about 15 wt. % of a phosphorus-containing flame retardant, wherein the phosphorus-containing flame retardant comprises resorcinol tetraphenyl diphosphate or bisphenol A bis(diphenyl)phosphate; and
   from 7 to 15 wt. % of metal fiber, each based on the total combined weight of the thermoplastic composition,
   wherein a molded sample of the thermoplastic composition having a thickness of 3.0 mm (±10%) has an EMI shielding of at least 20 dB and wherein a molded sample of the thermoplastic composition is capable of achieving UL94 V0 or V1 rating at a thickness of 1.5 mm (±10%), further wherein the thermoplastic composition is essentially free of chlorine and/or bromine flame retardants.

\* \* \* \* \*